United States Patent [19]

Kroner et al.

[11] Patent Number: 5,770,553
[45] Date of Patent: Jun. 23, 1998

[54] USE OF POLYASPARTIC ACID IN DETERGENTS AND CLEANERS

[75] Inventors: Matthias Kroner, Eisenberg; Gunnar Schornick, Neuleiningen; Richard Baur, Mutterstadt; Alexander Kud, Eppelsheim; Volker Schwendemann, Neustadt, all of Germany

[73] Assignee: BASF Aktiengesellschaft, Ludwigshafen, Germany

[21] Appl. No.: 646,263
[22] PCT Filed: Dec. 6, 1994
[86] PCT No.: PCT/EP94/04057
§ 371 Date: May 20, 1996
§ 102(e) Date: May 20, 1996
[87] PCT Pub. No.: WO95/16020
PCT Pub. Date: Jun. 15, 1995

[30] Foreign Application Priority Data

Dec. 11, 1993 [DE] Germany ............ 43 42 316.7

[51] Int. Cl.$^6$ .......... C11D 17/00; C11D 3/37; C08F 283/00; C02F 5/02
[52] U.S. Cl. .......... 510/360; 510/476; 510/490; 510/533; 510/501; 525/418; 525/419; 252/175; 252/180
[58] Field of Search ............... 510/501, 360, 510/476, 490, 533; 525/418, 419; 252/175, 180

[56] References Cited

U.S. PATENT DOCUMENTS 3,846,380  11/1974  Fujimoto et al. ............. 260/78 A

FOREIGN PATENT DOCUMENTS 561452  9/1993  European Pat. Off. .

OTHER PUBLICATIONS

Neri et. al., "Synthesis of α,β–poly[(2–hydroxyethyl)–d-l–aspartamide], . . . " J. of Med. Chem., vol. 16 (1973), No. 8, pp. 893–897.

*Primary Examiner*—Mukund J. Shah
*Assistant Examiner*—Tamthom T. Ngo
*Attorney, Agent, or Firm*—Oblon, Spivak, McClelland, Maier & Neustadt, P.C.

[57] ABSTRACT

The use of polyaspartic acid prepared by polycondensation of aspartic acid in the presence of phosphoric acid in a molar ratio of from 1:0.05 to 1:10 at temperatures of at least 120° C. to give polysuccinimide, and subsequent hydrolysis of the polysuccinimide with bases to give at least partially neutralized polyaspartic acid, as additive to detergents and cleaners in amounts of from 0.1 to 10% by weight, and detergents and cleaners which contain polyaspartic acids prepared in the presence of phosphoric acid.

5 Claims, No Drawings

USE OF POLYASPARTIC ACID IN DETERGENTS AND CLEANERS

This is a 371 application of PCT/EP 94/04057 filed on Dec. 6, 1994.

BACKGROUND OF THE INVENTION

1. Field of the Invention

The invention relates to the use of polyaspartic acid in detergents and cleaners and to detergents and cleaners containing polyaspartic acid.

2. Discussion of the Background

EP-A 0 454 126 discloses detergents which contain 10–40% by weight of a surfactant, 5–50% by weight of at least one sodium aluminum silicate, 0.5–70% by weight of at least one conventionally used additive and 5–50% by weight of at least one polyamino acid, preferably polyaspartic acid or polyglutamic acid, as builder.

EP-A 0 511 037 discloses detergent formulations which preferably contain an imide of polyaspartic acid and/or of polyglutamic acid in amounts of from 0.2 to 80% by weight.

As is evident from the above citations, the polyamino carboxylic acids described therein, and the corresponding polyimides, are biodegradable. According to Example 9 of EP-A 0 511 037, a polycondensate prepared by heating L-aspartic acid at 220° C. for 6.5 hours and then hydrolyzing with sodium hydroxide solution in aqueous medium is found in the ISO test to be 75% degraded in 28 days. However, if the degradation of this condensate is determined by the modified Zahn-Wellens test described below, degradations of from 50 to 60% are found. The processes which are furthermore known for the polycondensation of aspartic acid result in polyaspartic acids which display considerable differences in the biodegradability.

SUMMARY OF THE INVENTION

It is an object of the present invention to provide polyaspartic acids with particularly good biodegradability for use in detergents and cleaners.

We have found that this object is achieved by using polyaspartic acid prepared by polycondensation of aspartic acid in the presence of phosphoric acid in a molar ratio of from 1:0.05 to 1:10 at temperatures of at least 120° C. to give polysuccinimide, and subsequent hydrolysis of the polysuccinimide with bases to give at least partially neutralized polyaspartic acid, as additive to detergents and cleaners in amounts of from 0.1 to 10% by weight based on the detergents and cleaners.

The invention additionally relates to detergents and cleaners which comprise at least one surfactant, polyaspartic acid and, where appropriate, other conventional ingredients when they contain from 0.1 to 10% by weight of a polyaspartic acid prepared by polycondensation of aspartic acid in the presence of phosphoric acid in a molar ratio of from 1:0.05 to 1:10 at temperatures of at least 120° C. to give polysuccinimide, and subsequent hydrolysis of the polysuccinimide with bases to give at least partially neutralized polyaspartic acid.

DESCRIPTION OF THE PREFERRED EMBODIMENT

Whereas polyaspartic acids which can be prepared by thermal condensation of aspartic acid at temperatures of, for example, 180° to 220° C. or by reaction of maleic acid and ammonia in the molar ratio 1:1–1.5 at 120°–150° C. or 200° C. and conversion into the salt form have degradation rates of from 50 to 60%, the degradation rates of polyaspartic acids prepared by polycondensation of aspartic acid in the presence of phosphoric acid are at least 70, preferably at least 85, % (in each case determined as specified in the OECD Guidelines for Testing of Chemicals, 302 B, Modified Zahn-Wellens Test, ISBN 92-64-12221-4, Paris 1981). This test entails analysis of the decrease in the dissolved organic carbon (DOC decrease) in the test medium specified in DIN 38409, Part 3 (1983) under standardized conditions for up to 28 days.

The polyaspartic acid or its salts to be used according to the invention are prepared by known processes by condensation of aspartic acid in the presence of phosphoric acid, cf. Journal of Medicinal Chemistry 16 (1973) 893 and DE-A 4 023 463. The reaction temperature is at least 120° C. and is in most cases in the range from 140° to 250° C., preferably 160°–240° C.

The molar ratio of aspartic acid to phosphoric acid should be in the range from 1:0.05 to 1:10 and is preferably from 1:1 to 1:3. The phosphoric acid preferably used is technical 75–85% strength aqueous ortho-phosphoric acid. However, it is also possible to use 100% strength ortho-phosphoric acid or meta-phosphoric acid. It is likewise possible to use polymeric anhydrides of phosphoric acid (polyphosphoric acids), eg. diphosphoric acid (pyrophosphoric acid), triphosphoric acid and higher homologs of phosphoric acid. When the amounts of phosphoric acid used are above stoichiometric, the polycondensation is carried out in phosphoric acid as solvent and diluent.

The polycondensation of aspartic acid in the presence of phosphoric acid can be carried out by all known processes, eg. in phosphoric acid as solvent and diluent or in the melt, in a thin layer on a belt or in a kneader. The polycondensation can be carried out, for example, in such a way that initially aspartic acid is dissolved in phosphoric acid at up to 100° C. and then the mixture is heated to the polycondensation temperature under reduced pressure. The water which is introduced with the phosphoric acid where appropriate distils out during this and, at the same time, the aspartic acid dissolves in the phosphoric acid. As the polycondensation progresses there is an increase in the viscosity of the reaction mixture and, in parallel therewith, also in the molecular weight of the resulting polycondensates. Homogeneous solutions with very high viscosity of polyaspartimides in phosphoric acid are obtained.

The polycondensation is preferably carried out under reduced pressure, eg. at 10–100 mbar, or under an inert gas atmosphere. The polyaspartimides (=polysuccinimides) produced in the polycondensation are substantially or completely freed of phosphoric acid, eg. by washing with water. The phosphoric acid can be recovered from the washing solutions. The polysuccinimides are suspended in water and hydrolyzed and at least partially neutralized by adding a base. The hydrolysis rate can be increased by raising the temperature. Thus, the hydrolysis can be carried out relatively rapidly for example in the temperature range from 40° to 95° C.

Particularly suitable for the hydrolysis and the at least partial neutralization are alkali metal and alkaline earth metal bases, eg. sodium hydroxide solution, potassium hydroxide solution, sodium carbonate, potassium carbonate, magnesium hydroxide, calcium hydroxide or barium hydroxide. It is also possible to use ammonia and amines, eg. trimethylamine, triethylamine, diethylamine, ethanolamine, diethanolamine, triethanolamine and morpholine. The rates of hydrolysis and neutralization can be increased by exposing the reactants to ultrasound. Sodium hydroxide solution is preferably used for the hydrolysis and neutralization. The hydrolysis preferably takes place in the pH range from 8 to 10. Partially or completely neutralized polyaspartic acids are obtained. When the hydrolysis is partial, the degree of neutralization is preferably from 70 to 85 mol %.

The polyaspartic acids have a K value of from 10 to 150 (determined by the method of H. Fikentscher in 1% by weight aqueous solution at 25° C. on the Na salt and at pH 7). The polyaspartic acids obtainable in this way have a molecular weight $M_w$ of from 1 000 to 200 000 (determined by gel permeation chromatography with polyacrylic acid standards, calibrated with the aid of light-scattering). The molecular weight $M_w$ is preferably from 1 200 to 50 000.

The polyaspartic acids prepared by polycondensation in the presence of phosphoric acid, or their salts, are used according to the invention as additive to detergents and cleaners in amounts of from 0.1 to 10, preferably 1 to less than 5, % by weight, based on the detergents and cleaners. They improve the single wash cycle performance and act to disperse released soil in the wash liquor. The polyaspartic acids to be used according to the invention have the advantage by comparison with polyaspartic acids which can be prepared by other processes that they have, surprisingly, a considerably better biodegradability.

The polyaspartic acids and their salts are used in detergents and cleaners which comprise at least one surfactant and, where appropriate, other conventional ingredients. The detergents preferably contain completely biodegradable surfactants.

The detergents can be in powder form or else in a liquid formulation. The composition of the detergent and cleaner formulations can vary widely. Detergent and cleaner formulations normally contain from 2 to 50% by weight of surfactants and, where appropriate, builders. These data apply both to liquid and to powder detergents. Detergent and cleaner formulations customary in Europe, the USA and Japan are tabulated, for example, in Chemical and Engn. News, 67 (1989) 35. Further details of the composition of detergents and cleaners can be found in WO-A 90/13581 and Ullmanns Encyklopädie der technischen Chemie, Verlag Chemie, Weinheim 1983, 4th Edition, pages 63–160. The detergents may also, where appropriate, contain a bleach, eg. sodium perborate, which when used can be present in the detergent formulation in amounts of up to 30% by weight. The detergents and cleaners may, where appropriate, contain further conventional additives, eg. complexing agents, opacifying agents, optical brighteners, enzymes, perfume oils, color transfer inhibitors, antiredeposition agents and/or bleach activators.

Surprisingly, polyaspartic acids prepared by polycondensation in phosphoric acid have a better dispersing effect and enhance the single wash cycle performance better than polyaspartic acids prepared in the absence of phosphoric acid.

The K values of the polyaspartic acids were determined by the method of H. Fikentscher, Cellulose-Chemie, 13 (1932) 58–64 and 71–74, in aqueous solution at 25° C. with a concentration of 1% by weight of the sodium salt of the polyaspartic acids at pH 7.

The percentage data in the examples are percentages by weight.

EXAMPLES

Preparation of polyaspartic acid by condensation in the presence of phosphoric acid Condensate 1

1 kg of L-aspartic acid was mixed with a solution of 37 g of phosphoric acid in 100 ml of water in a laboratory kneader, and the mixture was heated while stirring under water pump vacuum to 164° C. and condensed at this temperature for 8 hours. The reaction mixture was then allowed to cool and the phosphoric acid was extracted with water. Fine-particle polysuccinimide was obtained.

In order to hydrolyze the polysuccinimide, 100 g thereof was suspended in 200 ml of water, the suspension was heated to 60° C. and 25% strength aqueous sodium hydroxide solution was added while maintaining a pH of 9 until a clear aqueous solution was produced. The degree of neutralization of the polyaspartic acid was about 80 mol %. The K value of the polyaspartic acid was 22.

Condensate 2

1 kg of aspartic acid was condensed with 98 g of 75% strength aqueous phosphoric acid in the molar ratio 1:0.1 in the laboratory kneader described above at 240° C. under reduced pressure for 3 hours and then hydrolyzed by the method indicated for condensate 1. The polyaspartic acid had a K value of 26.

Condensate 3

1 kg of aspartic acid was stirred with 1 kg of 75% strength aqueous phosphoric acid in a heatable reactor which was equipped with a stirrer and a device for operating under reduced pressure until a homogeneous solution was produced. The reactor was then evacuated and the reaction solution was heated to 180° C. while distilling out water. After condensation for 0.5 hour, the reaction mixture was cooled and then hydrolyzed and partially neutralized as described for condensate 1. The polyaspartic acid had a K value of 32 and a phosphorus content of 0.8%.

Condensate 4

As indicated for the preparation of condensate 3, the ratio of aspartic acid to phosphoric acid was 1:1, but the condensation was carried out at 180° C. for 8 hours. The resulting polyaspartic acid had a K value of 72.

Condensate 5

The preparation described for condensate 3 was repeated with the exception that aspartic acid was condensed in the presence of phosphoric acid in the molar ratio 2:5 at 160° C. for 6 hours. The resulting polyaspartic acid had a K value of 31 and a residual phosphorus content of 0.9%.

Condensate 6 (comparison)

Based on the preparation of polysuccinimide described in Example 1 of EP-A 0 511 037, particulate L-aspartic acid was thermally condensed at 220° C. in a drying oven for 6.5 hours, during which 95% of the water was removed. The polysuccinimide was then hydrolyzed by the method indicated for condensate 1. The resulting polyaspartic acid had a K value of 26.

Condensate 7 (comparison)

Polysuccinimide was prepared by reacting maleic acid/ammonia adducts at 200° C. by the process described in Comp.rend. 31 (1850) 433 and was hydrolyzed by the method described for condensate 1. The resulting polyaspartic acid had a K value of 11.

The condensates described above were tested for biodegradability by the modified Zahn-Wellens test. The test method is described in OECD Guidelines for Testing of Chemicals, 302 B, Modified Zahn-Wellens Test, ISBN 92-64-12221-4, Paris 1981. In this test, the decrease in dissolved organic carbon (DOC decrease) is measured under standardized conditions. Samples of each were taken and analyzed for the DOC decrease as described in DIN 38409, Part 3 (1983). The results obtained after 3 hours, 10 days and 28 days are indicated in Table 1.

TABLE 1

| Condensate No. | DOC decrease (%) after | | |
|---|---|---|---|
| | 3 h | 10 days | 28 days |
| 1 | 2 | 85 | >85 |
| 2 | 6 | 62 | 72 |
| 3 | 4 | 88 | 98 |
| 4 | 3 | 78 | 99 |
| 5 | <2 | 90 | >90 |
| 6 (comp.) | 6 | 49 | 53 |
| 7 (comp.) | 4 | 50 | 50 |

The effectiveness of the polyaspartic acids to be used according to the invention as additive to detergents was determined using the test for single wash cycle performance. In this test, the ability to detach clay from textile fabric is investigated in washing tests. Clay minerals are colored and they stain fabric when deposited thereon. In order to measure the single wash cycle performance for clay on the fabric, cotton/polyester fabric was uniformly coated with a clay mixture consisting of 33.3% of each of the types 178/R (ochre-colored), 262 (brown) and 84/rf (reddish brown) supplied by Carl Jäger, Hilgert. The types of clay differ in their "greasiness"; ie. they differ in the content of aluminum, iron and manganese oxides. The clay mixture was applied to the fabric homogeneously in the form of a 20% strength suspension in deionized water while circulating the suspension vigorously by pump. This was carried out using a jig from Küsters, Krefeld, at 10 meters/min using cotton/polyester fabric (33/67, supplied by Winkler, Waldshut). After passing through 3 times, one rinse with 600 l of deionized water was then carried out. The wet fabric was then fixed in a frame and dried at 50° C. and 2 meters/min drying rate. The clay fabric produced in this way contains 1.76% clay determined by ashing at 700° C., 2.5 h.

The washing tests were carried out under the following conditions:

| | |
|---|---|
| Washing machine: | Launder-o-meter |
| No. of washing cycles: | 1 |
| No. of rinsing cycles: | 1 |
| No. of washing tests: | 6 |
| Washing temperature: | 20–24° C. |
| Washing time: | 15 min |
| Amount of liquor: | 500 g of deionized water + 80 ppm ethoxylated oxo alcohol (C13,15 oxo alcohol + 8 ethylene oxide) |
| Water hardness ($Ca^{2+}$ + $Mg^{2+}$): | 1 mmol/l |
| $Ca^{2+}$:$Mg^{2+}$:$HCO_3$— molar ratio: | 3:1:6 |
| pH: | 10 ± 0.1 |
| Polymer test concentration: | 80 ppm |
| Soiled fabric: | 5 g of clay fabric |
| White fabric or clean fabric: | 5 g of polyester/cotton fabric |

Rinsing is followed by spinning, and the fabric is hung up singly to dry. The fabric is measured with an Elrepho 2000 from Data Color, Heidenheim, with 6 measurements per piece of fabric. The wavelength range used for the evaluation is 420–700 nm. The degree of reflection as a function of the wavelength is measured. Barium sulfate is used as reference. The color strength is calculated from the reflectance values, with weighting for the eye sensitivity function, as described by W. Baumann, R. Broßmann, B. T. Gröbel, N. Kleinemeier, M. Krayer, A. T. Leaver and H. -P. Oesch; Melliand Textilberichte 67 (1986) 562. The exact methods of calculation are to be found in Tenside, Surfactants, Detergents, 6 (1991) 497. The single wash cycle performance in % is calculated by the following equation:

$$P=(f_{s,b}-f_{s,a})/(f_{s,b}-f_{s,o})*100$$

$f_{s,b}$=Color strength of the soiled fabric (clay fabric) before washing.

$f_{s,a}$=Color strength of the soiled fabric after washing.

$f_{s,o}$=Color strength of the clean fabric before soiling.

The use of the color strength to calculate the single wash cycle performance has the advantage, compared with the reflectance at a wavelength or the K/S values (K=absorption coefficient and S=scatter coefficient) at a wavelength, which are used in the literature, that the visible region of the spectrum is covered and soil particles of all colors are included. The results of the tests are indicated in Table 2.

TABLE 2

| | Condensate No. | single wash cycle performance % (mean from 6 washing tests) |
|---|---|---|
| Example | | |
| 1 | 3 | 84.7 |
| 2 | 2 | 81.4 |
| 3 | 4 | 93.0 |
| Comparative example | | |
| 1 | no condensate | 55.7 |
| 2 | 6 | 73.5 |
| 3 | 7 | 65.7 |

Virtually completely biodegradable polyaspartic acids are obtained when the polycondensation of aspartic acid is carried out in the presence of phosphoric acid in the molar ratio of from 1:0.05 to 1:0.3 in the form of a solid-phase polycondensation, cf. preparation of condensates 8–10.

Condensate 8

666 g (5 mol) of aspartic acid are mixed with 98 g (0.75 mol) of 75% strength phosphoric acid and 350 g of water in a laboratory kneader to give a paste and are heated, while stirring and passing through a stream of nitrogen, to 120° C., during which water distils out. After the distillation is complete, the temperature is raised to 180° C. and the mixture is polycondensed at this temperature for 6 hours. After the polycondensation is complete, the polycondensate is extracted with water and converted by hydrolysis with sodium hydroxide solution into an aqueous poly-(sodium aspartate) solution. The K value is 32.5, corresponding to a molecular weight $M_w$=9,000.

Condensate 9

666 g (5 mol) of aspartic acid are polycondensed with 350 g of water and 130.7 g (1 mol) of 75% strength phosphoric acid in a kneader and are extracted and hydrolyzed as described for condensate 8. The K value of the poly(sodium aspartate) was 34.9, corresponding to a molecular weight $M_w$ of 10,500.

Condensate 10

666 g (5 mol) of aspartic acid are treated and polycondensed with 350 g of water and 177.6 g (1.36 mol) of 75% strength phosphoric acid in a kneader as for condensate 8. The polycondensate is worked up, extracted and hydrolyzed as described. The K value of the poly(sodium aspartate) is 38.9, corresponding to a molecular weight $M_w$ of 13,000.

We claim:

1. A method of preparing a detergent or cleaner, comprising polycondensing aspartic acid in the presence of phosphoric acid in a molar ratio of from 1:0.05 to 1:10 at temperatures of at least 120° C. to give polysuccinimide, and subsequently hydrolyzing the polysuccinimide with bases to give at least partially neutralized polyaspartic acid, and adding said partially neutralized polyaspartic acid to detergents or cleaners in amounts of from 0.1 to 10% by weight based on the detergents and cleaners.

2. The method as claimed in claim 1, wherein the polycondensation of aspartic acid is carried out in the presence of phosphoric acid in a molar ratio of from 1:1 to 1:3 at from 140° to 250° C.

3. The method as claimed in claim 1, wherein the detergents or cleaners contain from 1 to less than 5% by weight of the at least partially neutralized polyaspartic acid.

4. A detergent or cleaner which contains at least one surfactant and polyaspartic acid with or without other conventional ingredients, which contains from 0.1 to 10% by weight of a polyaspartic acid which has been prepared by polycondensation of aspartic acid in the presence of phosphoric acid in a molar ratio of from 1:0.05 to 1:10 at temperatures of at least 120° C. to give polysuccinimide, and subsequent hydrolysis of the polysuccinimide with bases to give at least partially neutralized polyaspartic acid.

5. A detergent or cleaner as claimed in claim 4, which contains from 1 to less than 5% by weight of polyaspartic acid.

* * * * *